United States Patent
Mutsuno (10) Patent No.: US 9,940,076 B2
(45) Date of Patent: Apr. 10, 2018

(54) PRINTING APPARATUS, METHOD FOR CONTROLLING THE SAME, AND STORAGE MEDIUM

(71) Applicant: CANON KABUSHIKI KAISHA, Tokyo (JP)

(72) Inventor: Masahiro Mutsuno, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/272,881

(22) Filed: Sep. 22, 2016

(65) Prior Publication Data
US 2017/0090829 A1     Mar. 30, 2017

(30) Foreign Application Priority Data
Sep. 28, 2015    (JP) ................................ 2015-190467

(51) Int. Cl.
*G06F 3/12*    (2006.01)

(52) U.S. Cl.
CPC ............ *G06F 3/1217* (2013.01); *G06F 3/121* (2013.01); *G06F 3/1234* (2013.01); *G06F 3/1248* (2013.01); *G06F 3/1263* (2013.01); *G06F 3/1285* (2013.01); *G06F 3/1286* (2013.01)

(58) Field of Classification Search
None
See application file for complete search history.

(56) References Cited

U.S. PATENT DOCUMENTS 6,473,192 B1 * 10/2002 Kidani .................... G06F 3/121
                                                            358/1.14

FOREIGN PATENT DOCUMENTS

JP              11-134122 A        5/1999

* cited by examiner

*Primary Examiner* — Andrew H Lam
(74) *Attorney, Agent, or Firm* — Canon U.S.A., Inc. IP Division (57) ABSTRACT

A printing apparatus includes an accepting unit configured to accept one of a first setting and a second setting, the first setting indicating that another print job managed by the management unit is to be executed while leaving an execution of the print job interrupted, and the second setting indicating that execution of the print job is to be canceled, and a control unit configured to, when the first setting is made in a case where a job interruption event occurs during execution of a print job, execute another print job managed by the management unit while leaving the execution of the print job interrupted, or to, when the second setting is made in a case where a job interruption event occurs during execution of a print job, cancel the execution of the print job.

20 Claims, 8 Drawing Sheets

PRINTING APPARATUS, METHOD FOR CONTROLLING THE SAME, AND STORAGE MEDIUM

BACKGROUND OF THE INVENTION

Field of the Invention

The present invention relates to a printing apparatus for controlling the execution of print jobs, a method for controlling the printing apparatus, and a storage medium.

Description of the Related Art

Conventional printing apparatuses that control the execution of print job are known. Print jobs include a Page Description Language (PDL) job entered from a client computer that communicates with the printing apparatus via a network. Print jobs further include a copy job of reading an image of a document by using a scanner provided on the printing apparatus and performing printing based on the read image.

In the printing apparatus, a job interruption factor (job interruption event) such as an error may occur during execution of a print job. For example, when the job interruption event occurred is a paper out event, the execution of the print job is interrupted and is not resumed until a user replenishes paper. Japanese Patent Application Laid-Open No. 11-134122 discusses a technique for preferentially executing subsequent jobs if a paper out event occurs.

A specific example will be described below. When A4-size paper (sheet) runs out during execution of a print job (first job) for printing an image on A4-size paper, the print job is interrupted and is not resumed until A4-size paper is replenished. However, when there is a subsequent print job for printing an image on A3-size paper after the first print job and A3-size paper is set in another sheet paper cassette, a printing apparatus executes the second and subsequent print jobs while leaving the execution of the first print job interrupted. This enables preventing the entire processing efficiency from being lowered by the prolongation of downtime of the printing apparatus.

As described above, if a job interruption event occurs during execution of a print job, the entire processing efficiency can be prevented from being lowered by preferentially executing subsequent jobs. However, there may arise another problem that the interrupted print job is left unexecuted for a long time.

More specifically, when A4-size paper runs out during execution of a print job for printing an image on A4-size paper and A4-size paper is not replenished for a long time, the interrupted print job is left unexecuted. It is not desirable from the viewpoint of security that the interrupted print job is left unexecuted for a long time particularly in a case where confidential information is included in the contents to be printed by the print job. Accordingly, it can be considered that, if a job interruption event occurs during execution of a print job, the execution of the print job is automatically canceled.

If a job interruption event occurs during execution of a print job, the printing apparatus may either execute other print jobs while leaving the execution of the interrupted print job or cancel the execution of the print job with which the job interruption event occurred. Which processing is more desirable depends on the environment where the printing apparatus is used. For example, in an environment where security is given priority, it is more desirable to cancel the print job. However, if the print job is canceled, the owner of the canceled print job needs to reenter an instruction for executing the print job, which is troublesome. Therefore, in a certain environment, the owner does not want to cancel the print job. However, conventionally, there has been no consideration about selectively setting whether to, if a job interruption event occurs during execution of a print job, execute other print jobs while leaving the execution of the print job interrupted or cancel the execution of the print job with which the job interruption event occurred.

SUMMARY OF THE INVENTION

The present invention is directed to a printing apparatus capable of selectively setting whether to, if a job interruption event occurs during execution of a print job, execute other print jobs while leaving the execution of the print job interrupted or cancel the execution of the print job with which the job interruption event occurred.

According to an aspect of the present invention, a printing apparatus includes a management unit configured to manage an execution order of a plurality of print jobs, an accepting unit configured to accept a first setting or a second setting, the first setting indicating that, in a case where a job interruption event occurs during execution of a print job, another print job managed by the management unit is to be executed while leaving an execution of the print job interrupted, the second setting indicating that, in a case where a job interruption event occurs during execution of a print job, execution of the print job is to be canceled, and a control unit configured to, when the first setting is made in a case where a job interruption event occurs during execution of a print job, execute another print job managed by the management unit while leaving the execution of the print job interrupted, or to, when the second setting is made in a case where a job interruption event occurs during execution of a print job, cancel the execution of the print job.

Further features of the present invention will become apparent from the following description of exemplary embodiments with reference to the attached drawings.

DESCRIPTION OF THE EMBODIMENTS

A first exemplary embodiment will be described in detail below with reference to the accompanying drawings. The following exemplary embodiment is not intended to limit the present invention according to the ambit of the appended claims. Not all of the combinations of the features described in the exemplary embodiment are indispensable to the solutions for the present invention.

Figure 1:
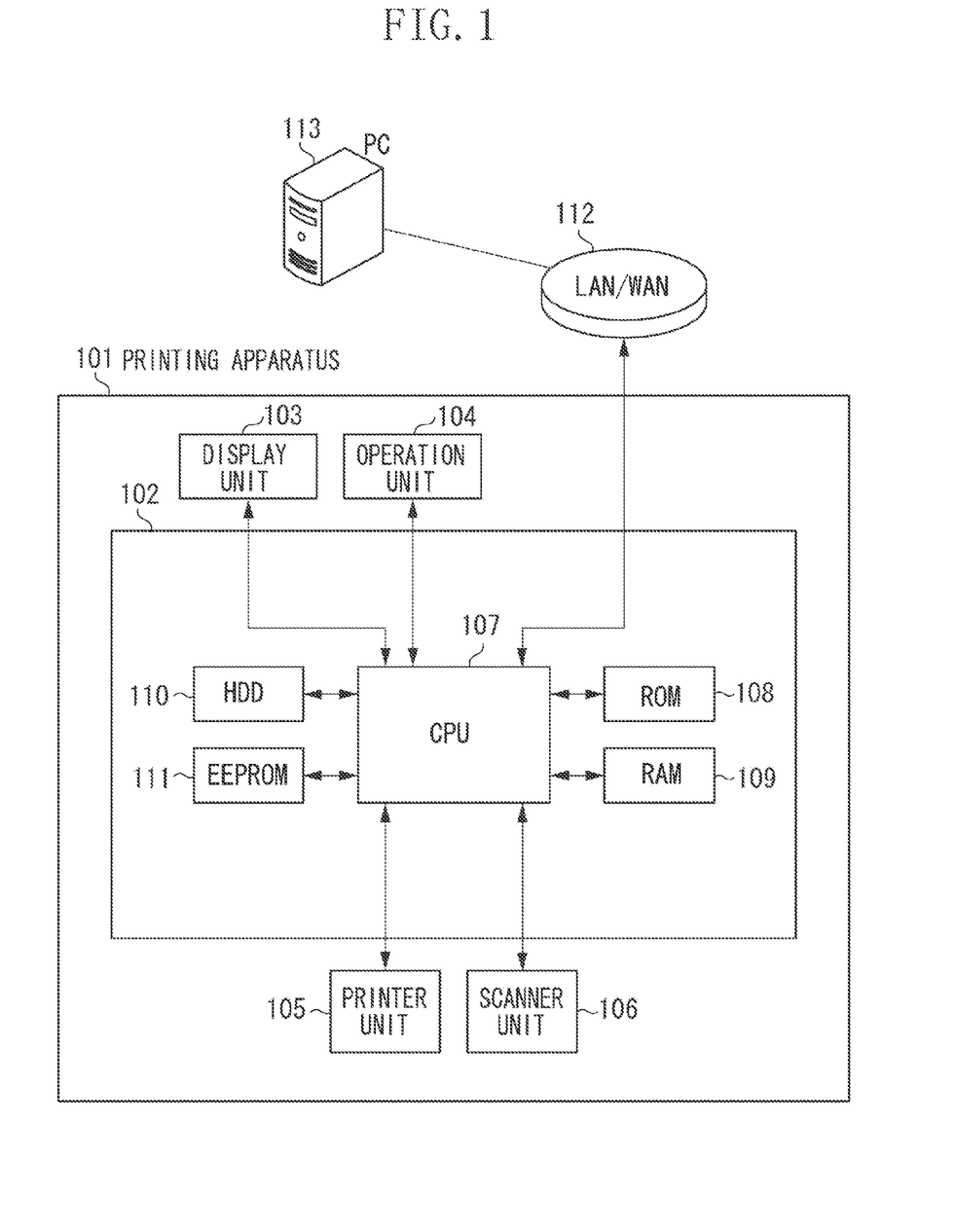
FIG. 1 illustrates an entire configuration of a system including a printing apparatus according to an exemplary embodiment.

FIG. 1 illustrates an entire system including a printing apparatus 101 as an example of a printing apparatus according to the first exemplary embodiment. The printing apparatus 101 includes a controller unit 102, a display unit 103, an operation unit 104, a printer unit 105, and a scanner unit 106. The display unit 103 is provided with light emitting diodes (LEDs) and a liquid crystal display to display user operations and internal statuses of the printing apparatus 101. The operation unit 104 receives a user operation via hardware keys and a touch-panel function of the display unit 103.

The printer unit 105 accepts a print instruction from the controller unit 102, and prints an image on a sheet based on image data transmitted from the controller unit 102. The printer unit 105 includes a fixing unit for fixing an image (toner image) transferred onto the sheet. The printer unit 105 is able to print an image on sheets of a plurality of sizes such as A4 and A3 sizes. Sheets include plain paper, thick paper, and recording media such as transparent films.

The scanner unit 106 accepts a read instruction from the controller unit 102, reads an image on a document, and transmits obtained image data to the controller unit 102. The printer unit 105 is also able to perform printing based on image data generated by the scanner unit 106.

The controller unit 102 includes a central processing unit (CPU) 107, a read only memory (ROM) 108, a random access memory (RAM) 109, a hard disk drive (HDD) 110, and an electrically erasable programmable ROM (EEPROM) 111. The CPU 107 is an execution medium of a control program built in the printing apparatus 101, and controls the operation of devices connected to the controller unit 102 via individual interface (I/F) and a memory of a storage medium. The ROM 108 stores a boot program required for system activation. The RAM 109 is a volatilization memory and is used as a work memory when executing a control program.

The HDD 110 is a storage medium such as a magnetic disk and stores control programs, image data, etc. The EEPROM 111 is a nonvolatile memory and stores setting values required to execute a control program. The EEPROM 111 stores information (sheet size and sheet type) for each sheet storage unit.

The CPU 107 is able to receive PDL data from a personal computer (PC) 113 serving as an external apparatus via a local area network (LAN)/wide area network (WAN) 112 and instruct the printer unit 105 to perform printing based on the received PDL data (PDL job). PDL data is generated by a printer driver installed in the PC 113 serving as a host computer.

Although, in the printing apparatus 101, the CPU 107 executes processing illustrated in flowcharts (described below) by using one memory (RAM 109), other modes may also be applicable. For example, a plurality of CPUs, a plurality of RAMs, an HDD, and a solid state drive (SSD) may operate in collaboration to execute the processing. Further, a part of processing (described below) may be performed by using hardware circuits such as an application specific integrated circuit (ASIC).

Figure 2:
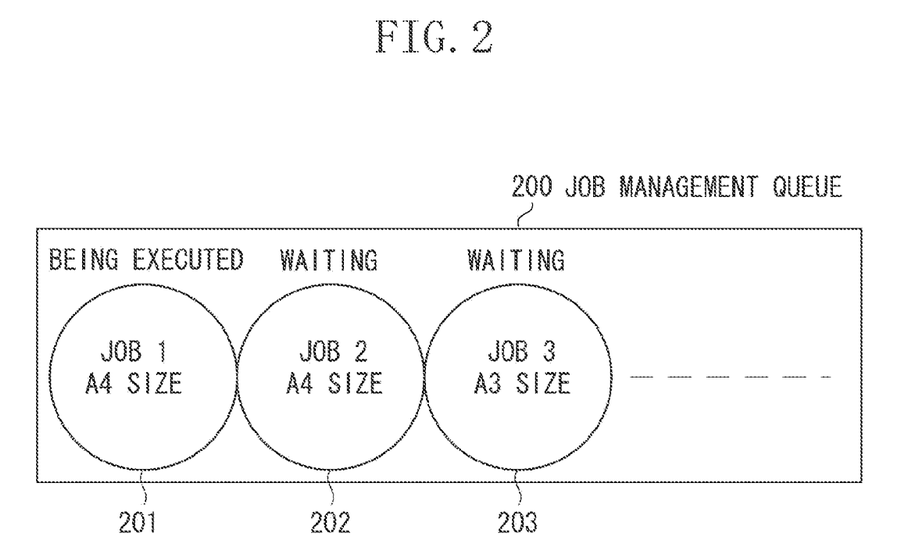
FIG. 2 illustrates a concept of a job management queue according to an exemplary embodiment.

FIG. 2 illustrates a concept of a job management queue 200 used by the printing apparatus 101 to manage print jobs. Print jobs including image data and print settings are stored in the HDD 110 or the RAM 109, and the execution order of these print jobs is managed by the job management queue 200. The HDD 110 and the RAM 109 are able to store a plurality of print jobs. During execution of one print job, other print jobs are not executed but waiting. The job management queue 200 manages print jobs by arranging them in order of entry (in order of acceptance of print jobs by the printing apparatus 101).

In the example illustrated in FIG. 2, a current job 1 (201) is being executed and subsequent print jobs (a job 2 (202) and a job 3 (203)) are waiting. Upon completion of the execution of the job 1 (201), the execution of the job 2 (202) is started. If a job interruption event such as an error occurs during execution of a print job, the execution of the print job is interrupted. Until the error is solved, the execution of the print job is not resumed and other print jobs also remain waiting. However, with "Change Job Order" (described in detail below), the printing apparatus 101 starts the execution of the following print jobs while leaving the execution of the preceding interrupted job. Each print job includes information indicating sizes of the sheets to be used for printing, such as A4 and A3. In addition to the information indicating sheet sizes, various print settings such as information about monochrome/color, information about one-sided/two-sided printing, and information about the number of copies.

Figure 3:
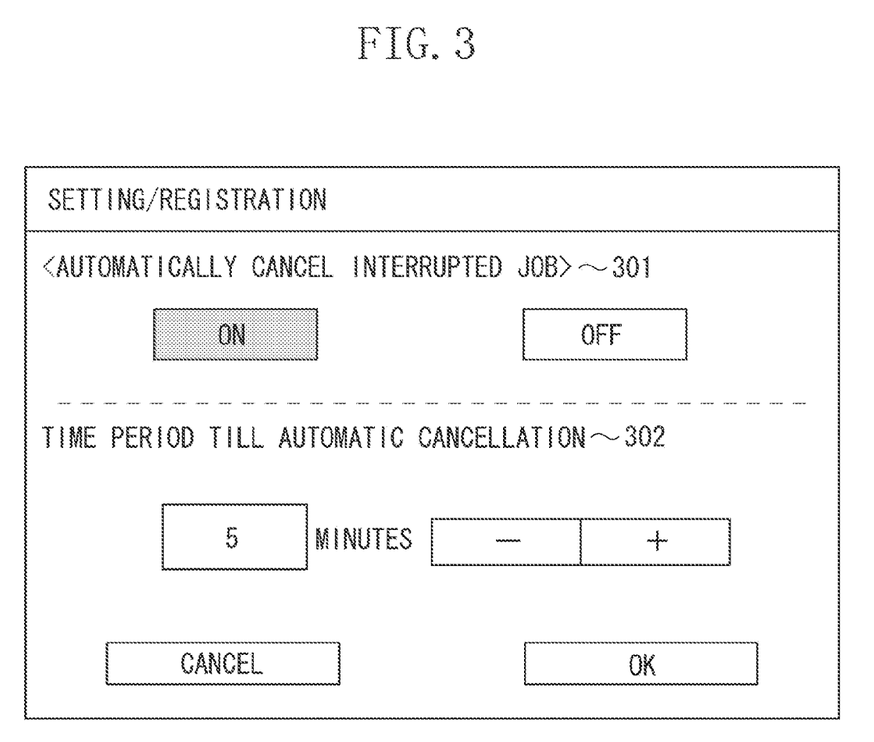
FIG. 3 illustrates an example of an operation screen displayed by the printing apparatus according to an exemplary embodiment.

FIG. 3 illustrates an operation screen displayed on the display unit 103 when performing setting relating to "Automatically Cancel Interrupted Job". As described above, if an error occurs during execution of a print job, the execution of the print job is interrupted and is not resumed until the error is solved. In this case, if a long time has elapsed with the error unsolved, the interrupted print job will be left unexecuted for a long time. This state is not desirable from the viewpoint of security particularly in a case where confidential information is included in the contents to be printed based on the print job.

Taking this point into consideration, the printing apparatus 101 is provided with an "Automatically Cancel Interrupted Job" function. If an error occurs during execution of a print job, the execution of the print job is interrupted. "Automatically Cancel Interrupted Job" is a function of automatically canceling the interrupted print job when the state of the interrupted execution of the print job lasts for a predetermined time period. When the interrupted print job is canceled, other print jobs entered in the job management queue 200 will also be canceled together with the interrupted print job because security is given priority. However, it is also useful to cancel only the interrupted print job.

The "Automatically Cancel Interrupted Job" function can be set to ON or OFF by using an item 301 included in the operation screen illustrated in FIG. 3. When the "Automatically Cancel Interrupted Job" function is set to ON, a predetermined time period (time period T1) can be set by using an item 302. The operation screen illustrated in FIG. 3 can be operated only by the administrator of the printing apparatus 101. To display the operation screen illustrated in FIG. 3, an operator thereof needs to be authenticated as an administrator.

Figure 4:
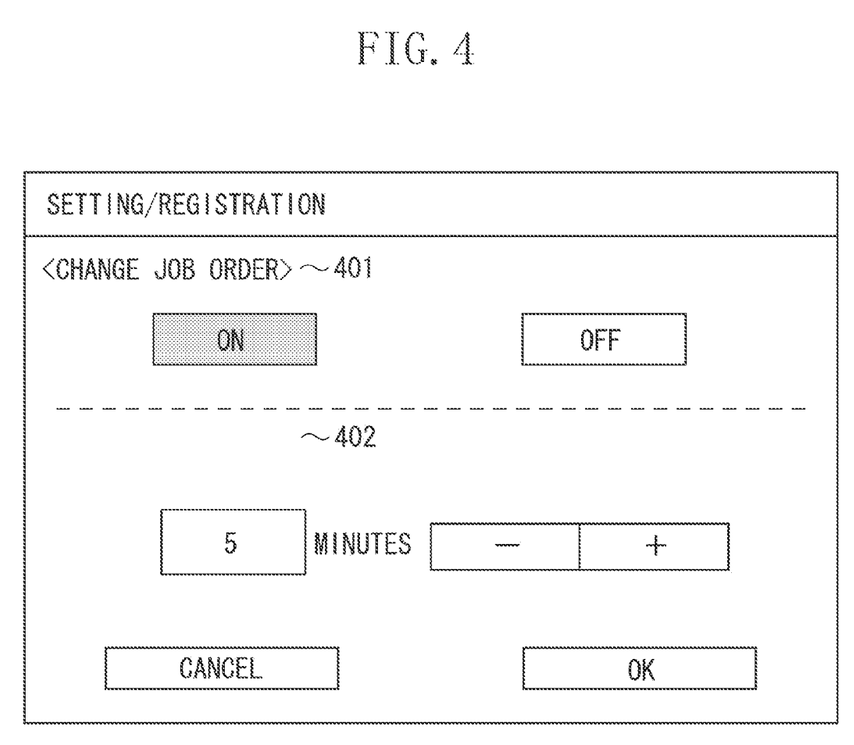
FIG. 4 illustrates an example of an operation screen displayed by the printing apparatus according to an exemplary embodiment.

FIG. 4 illustrates an operation screen displayed on the display unit 103 when settings relating to "Change Job Order" for print jobs are made. As described above, if an error occurs during execution of a print job, the execution of the print job is interrupted and other print jobs remain waiting. A specific example will be described. When A4-size paper runs out during execution of a print job for printing an image on A4-size paper, the execution of the print job is interrupted and is not resumed until A4-size paper is replenished. However, when there is a subsequent print job for printing an image on A3-size paper after the first print job, and A3-size paper is set in another sheet paper cassette, the printing apparatus 101 executes the second and subsequent print jobs while leaving the execution of the first print job interrupted. This enables preventing the entire processing efficiency from being lowered by the prolongation of downtime of the printing apparatus 101.

Taking this point into consideration, the printing apparatus 101 is provided with a "Change Job Order" function. If a paper out error occurs during execution of a print job, the execution of the print job is interrupted. The "Change Job Order" function is a function of executing an executable print job out of subsequent print jobs (i.e., pass the preceding job) when the state of the interrupted execution of the print job lasts for a predetermined time period. The "Change Job Order" function can be performed only for a paper out error and cannot be performed for other errors (a toner out error and a sheet jam error).

The "Change Job Order" function can be selected by using an item 401 included in the operation screen illustrated in FIG. 4. When the "Change Job Order" function is set to ON, the length of a predetermined time period (time period T2) can be set by using an item 402. A general user of the printing apparatus 101 is able to operate the operation screen illustrated in FIG. 4, and does not need to be authenticated as an administrator to display the operation screen illustrated in FIG. 4.

Figure 5:
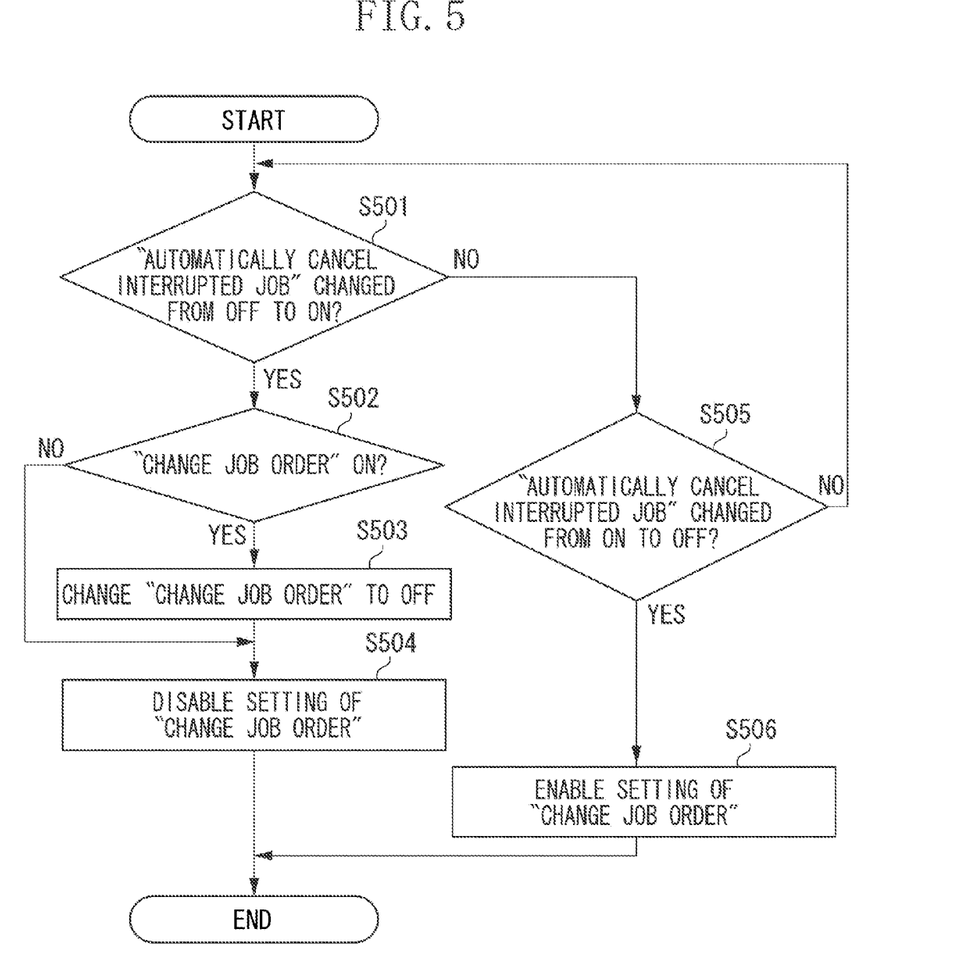
FIG. 5 is a flowchart illustrating an operation of the printing apparatus according to an exemplary embodiment.

FIG. 5 is a flowchart illustrating an operation relating to the settings of "Automatically Cancel Interrupted Job" and "Change Job Order". This flowchart is repetitively started at short predetermined intervals while the printing apparatus 101 is operating. Each operation (step) in the flowchart illustrated in FIG. 5 is implemented when the CPU 107 of the printing apparatus 101 executes a control program stored in the ROM 108.

In step S501, the CPU 107 determines whether the setting of "Automatically Cancel Interrupted Job" is changed from OFF to ON. When the setting of "Automatically Cancel Interrupted Job" is changed from OFF to ON (YES in step S501), the processing proceeds to step S502. On the other hand, when the setting of "Automatically Cancel Interrupted Job" is not changed from OFF to ON (NO in step S501), the processing proceeds to step S505. In step S502, the CPU 107 determines whether the setting of "Change Job Order" is ON. When the setting of "Change Job Order" is ON (YES in step S502), the processing proceeds to step S503. On the other hand, when the setting of "Change Job Order" is not ON (the setting is OFF) (NO in step S502), the processing proceeds to step S504.

In step S503, the CPU 107 changes the setting of "Change Job Order" to OFF. "Change Job Order" is set to OFF based on the setting of "Automatically Cancel Interrupted Job" having been changed from OFF to ON. This is because "Automatically Cancel Interrupted Job" and "Change Job Order" can be exclusively set and the setting of "Automatically Cancel Interrupted Job" is given priority. In step S504, the CPU 107 disables setting of "Change Job Order". More specifically, the CPU 107 makes setting so that "ON" of the item 301 is displayed in grayout when the operation screen illustrated in FIG. 4 is displayed.

"Automatically Cancel Interrupted Job" and "Change Job Order" can be exclusively set. This is because, if "Automatically Cancel Interrupted Job" is executed despite "Change Job Order" being ON, user's confusion may possibly arise. Similarly, if "Change Job Order" is executed despite "Automatically Cancel Interrupted Job" being ON, user's confusion may possibly arise. The setting of "Automatically Cancel Interrupted Job" is given priority because "Change Job Order" is set by a general user while "Automatically Cancel Interrupted Job" is set by the administrator from the viewpoint of security.

In step S505, the CPU 107 determines whether the setting of "Automatically Cancel Interrupted Job" is changed from ON to OFF. When the setting of "Automatically Cancel Interrupted Job" is changed from ON to OFF (YES in step S505), the processing proceeds to step S506. On the other hand, when the setting of "Automatically Cancel Interrupted Job" is not changed from ON to OFF (NO in step S505), the processing returns to step S501. In step S506, the CPU 107 enables setting of "Change Job Order". More specifically, the CPU 107 makes setting so that "ON" of the item 301 is not displayed in grayout when the operation screen illustrated in FIG. 4 is displayed.

Figure 6:
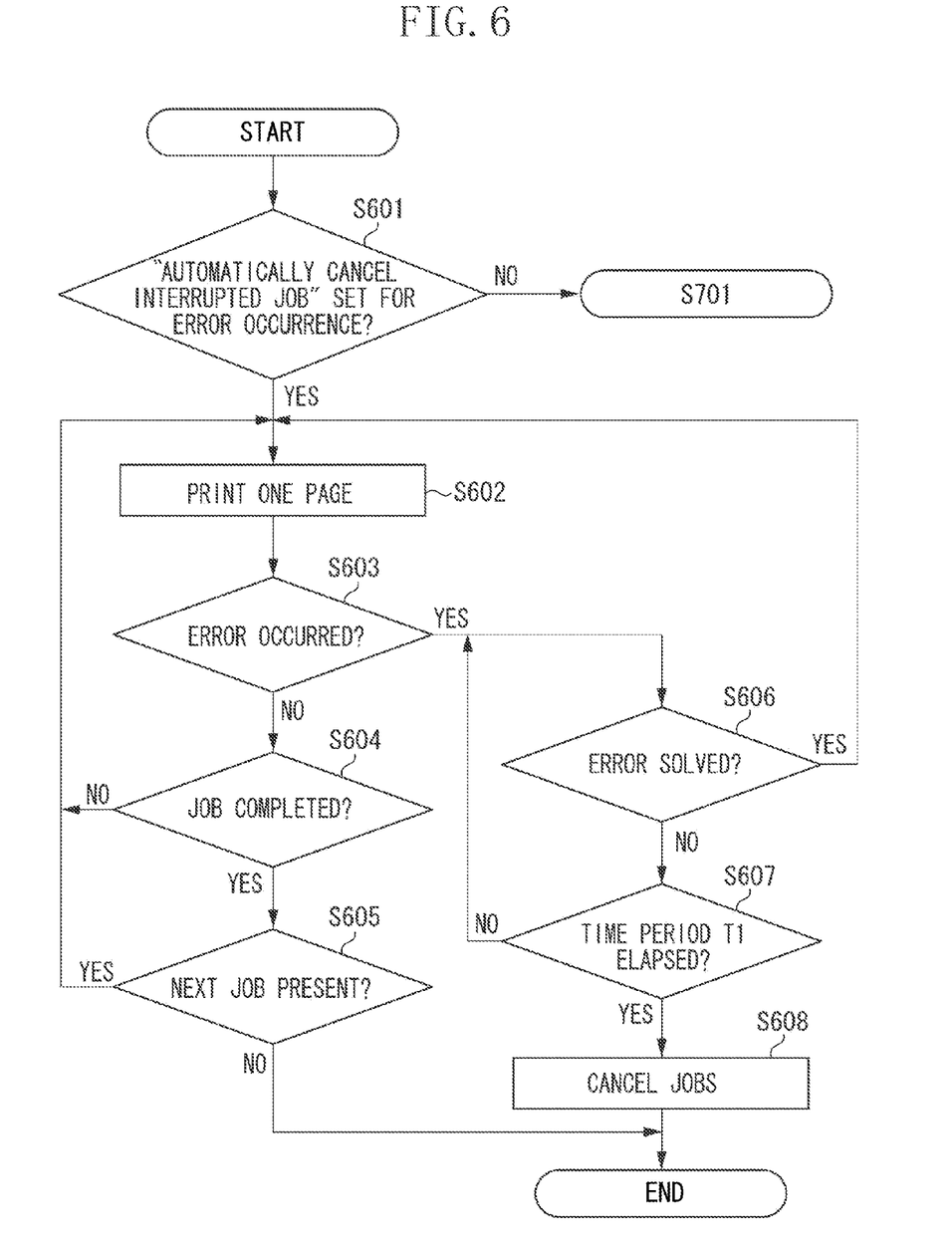
FIG. 6 is a flowchart illustrating an operation of the printing apparatus according to an exemplary embodiment.
Figure 7:
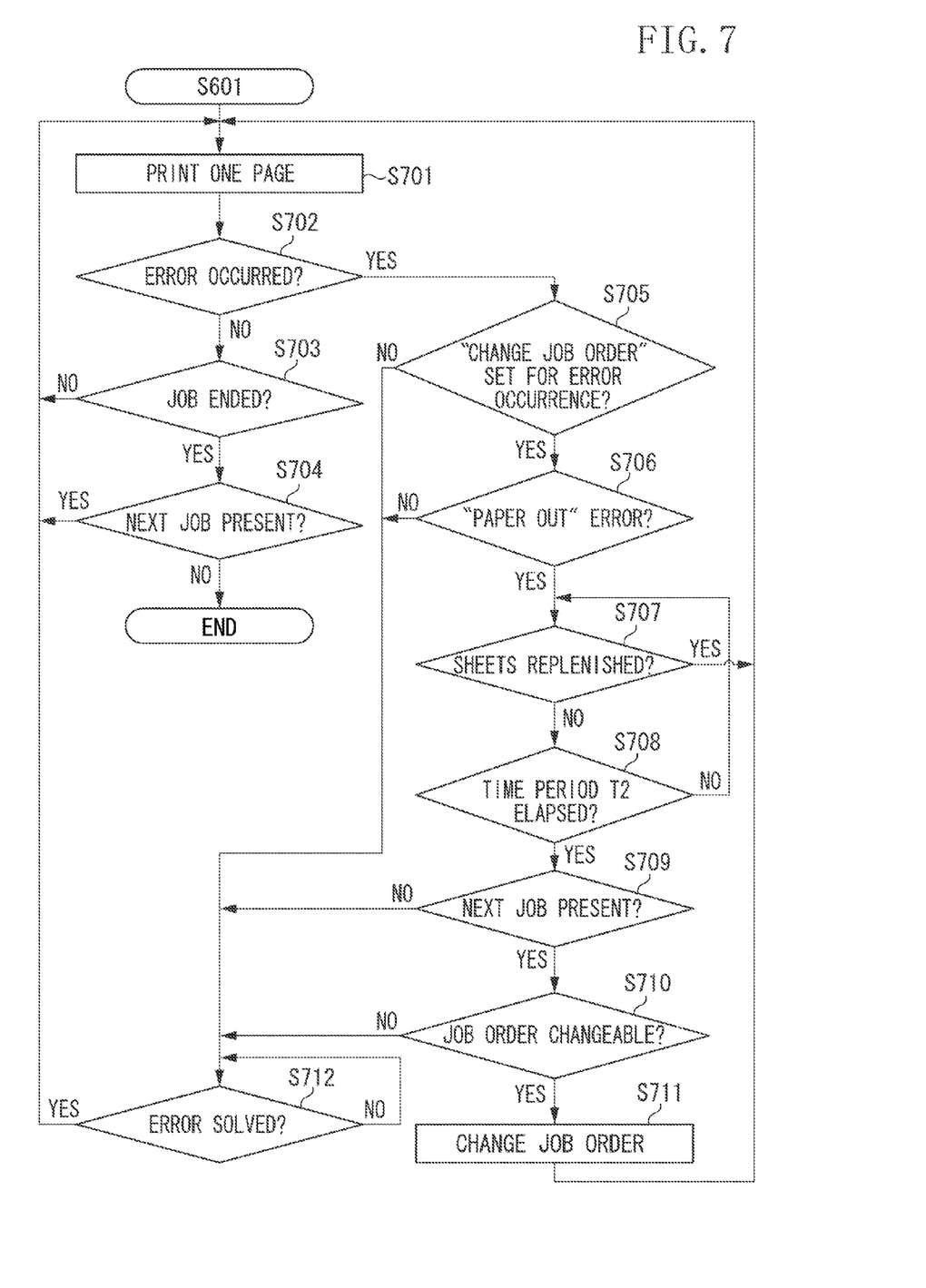
FIG. 7 is a flowchart illustrating an operation of the printing apparatus according to an exemplary embodiment.

FIGS. 6 and 7 are flowcharts illustrating operations relating to the execution of a print job. Each operation (step) in the flowcharts illustrated in FIGS. 6 and 7 is implemented when the CPU 107 of the printing apparatus 101 executes a control program stored in the ROM 108.

In step S601, the CPU 107 determines the current setting for the error occurrence. When "Automatically Cancel Interrupted Job" described with reference to FIG. 3 is set (YES in step S601), the processing proceeds to step S602. On the other hand, when "Change Job Order" described with reference to FIG. 4 is set or when none is set (NO in step S601), the processing proceeds to step S701.

In step S602, the CPU 107 prints one page based on a print job. In step S603, the CPU 107 determines whether a certain error that restricts the execution of a print job has occurred. If an error occurs (YES in step S603), the processing proceeds to step S606. On the other hand, if an error has not occurred (NO in step S603), the processing proceeds to step S604.

In step S604, the CPU 107 determines whether the execution of the current print job is completed (printing is completed for all pages). When the execution of the current print job is completed (YES in step S604), the processing proceeds to step S605. On the other hand, when the execution of the current print job is not completed (NO in step S604), the processing returns to step S602. In step S602, the CPU 107 prints the next page. In step S605, the CPU 107 determines whether the next job is present with reference to the job management queue 200. When the next job is present (YES in step S605), the processing returns to step S602. In step S602, the CPU 107 prints the first page of the next job. On the other hand, when the next job is not present (NO in step S605), the processing ends.

In step S606, the CPU 107 determines whether the error has occurred is solved. When the error occurred is a paper out error, the error will be solved when the user replenishes sheets. When the error occurred is a toner out error, the error will be solved when the user replenishes toner. When the error occurred is a sheet jam error, the error will be solved when the user removes the jammed sheet. When the error occurred is solved (YES in step S606), the processing returns to step S602. In step S602, the CPU 107 prints the next page. On the other hand, when the error occurred is not solved (NO in step S606), the processing proceeds to step S607. In step S607, the CPU 107 determines whether the predetermined period T1 has elapsed.

When the predetermined time period T1 has elapsed (YES in step S607), the processing proceeds to step S608. On the other hand, when the predetermined time period T1 has not elapsed (NO in step S607), the processing returns to step S606. In step S608, the CPU 107 cancels the print job interrupted due to the error and other print jobs entered in the job management queue 200 at this timing.

In step S701, the CPU 107 prints one page based on a print job. In step S702, the CPU 107 determines whether a certain error that restricts the execution of a print job has occurred. If an error has occurred (YES in step S702), the processing proceeds to step S705. On the other hand, if an error has not occurred (NO in step S702), the processing proceeds to step S703.

In step S703, the CPU 107 determines whether the execution of the current print job is completed (printing is completed for all pages). When the execution of the current print job is completed (YES in step S703), the processing proceeds to step S704. On the other hand, when the execution of the current print job is not completed (NO in step S703), the processing returns to step S701. In step S701, the CPU 107 prints the next page. In step S704, the CPU 107 determines whether the next job is present with reference to the job management queue 200. When the next job is present (YES in step S704), the processing returns to step S701. In step S701, the CPU 107 prints the first page of the next job. On the other hand, when the next job is not present (NO in step S704), the processing ends.

In step S705, the CPU 107 determines whether "Change Job Order" is set for the error occurrence. When "Change Job Order" is set (YES in step S705), the processing proceeds to step S706. On the other hand, when "Change Job Order" is not set (more specifically, when neither "Automatically Cancel Interrupted Job" nor "Change Job Order" is set) (NO in step S705), the processing proceeds to step S712.

In step S706, the CPU 107 determines whether the error occurred is a paper out error. When the error occurred is a paper out error (YES in step S706), the processing proceeds to step S707. On the other hand, when the error occurred is not a paper out error (NO in step S706), the processing proceeds to step S712. In step S707, the CPU 107 determines whether sheets required to execute the interrupted print job are replenished by the user. When sheets are replenished (YES in step S707), the processing returns to step S701. In step S701, the CPU 107 prints the next page. On the other hand, when sheets are not replenished (NO in step S707), the processing proceeds to step S708.

In step S708, the CPU 107 determines whether the predetermined time period T2 has elapsed since the error occurred. When the predetermined period T2 has elapsed (YES in step S708), the processing proceeds to step S709. On the other hand, when the predetermined time period T2 has not elapsed (NO in step S708), the processing returns to step S707. In step S709, the CPU 107 determines whether the next job is present with reference to the job management queue 200. When the next job is present (YES in step S709), the processing proceeds to step S710. On the other hand, when the next job is not present (NO in step S709), the processing proceeds to step S712.

In step S710, the CPU 107 determines whether the next job is a job order changeable job. In this case, when the next job uses a sheet size different from that for the interrupted print job and sheets of the size are set in a sheet paper cassette, the CPU 107 determines that the next job is a job order changeable job. When the next job is a job order changeable job (YES in step S710), the processing proceeds to step S711. On the other hand, when the next job is not a job order changeable job (NO in step S710), the processing proceeds to step S712. In step S711, the CPU 107 executes a subsequent job determined to be a job order changeable job in step S710 while leaving the execution of the preceding job interrupted. The next job refers not only to the print job immediately after the interrupted print job but also to all of print jobs entered after the interrupted print job.

In step S712, the CPU 107 determines whether the error occurred is solved. When the error occurred is a paper out error, the error will be solved when the user replenishes sheets. When the error occurred is a toner out error, the error will be solved when the user replenishes toner. When the error occurred is a sheet jam error, the error will be solved when the user removes the jammed sheet. When the error occurred is solved (YES in step S712), the processing returns to step S701. In step S701, the CPU 107 prints the next page. On the other hand, when the error occurred is not solved (NO in step S712), the CPU 107 waits until the error occurred is resolved.

In the first exemplary embodiment, exclusive setting of "Automatically Cancel Interrupted Job" and "Change Job Order" is enabled in the following way. When "Automatically Cancel Interrupted Job" is set to ON, the CPU 107 sets "Change Job Order" to OFF and further disables setting of "Change Job Order". On the other hand, in a second exemplary embodiment, when both "Automatically Cancel Interrupted Job" and the "Change Job Order" are set to ON, the CPU 107 sets one of "Automatically Cancel Interrupted Job" and "Change Job Order" to ON and sets the other to OFF depending on the predetermined time periods T1 and T2. In the following description, differences from the first exemplary embodiment will be described. Other points in the second exemplary embodiment are considered to be similar to those of the first exemplary embodiment.

Figure 8:
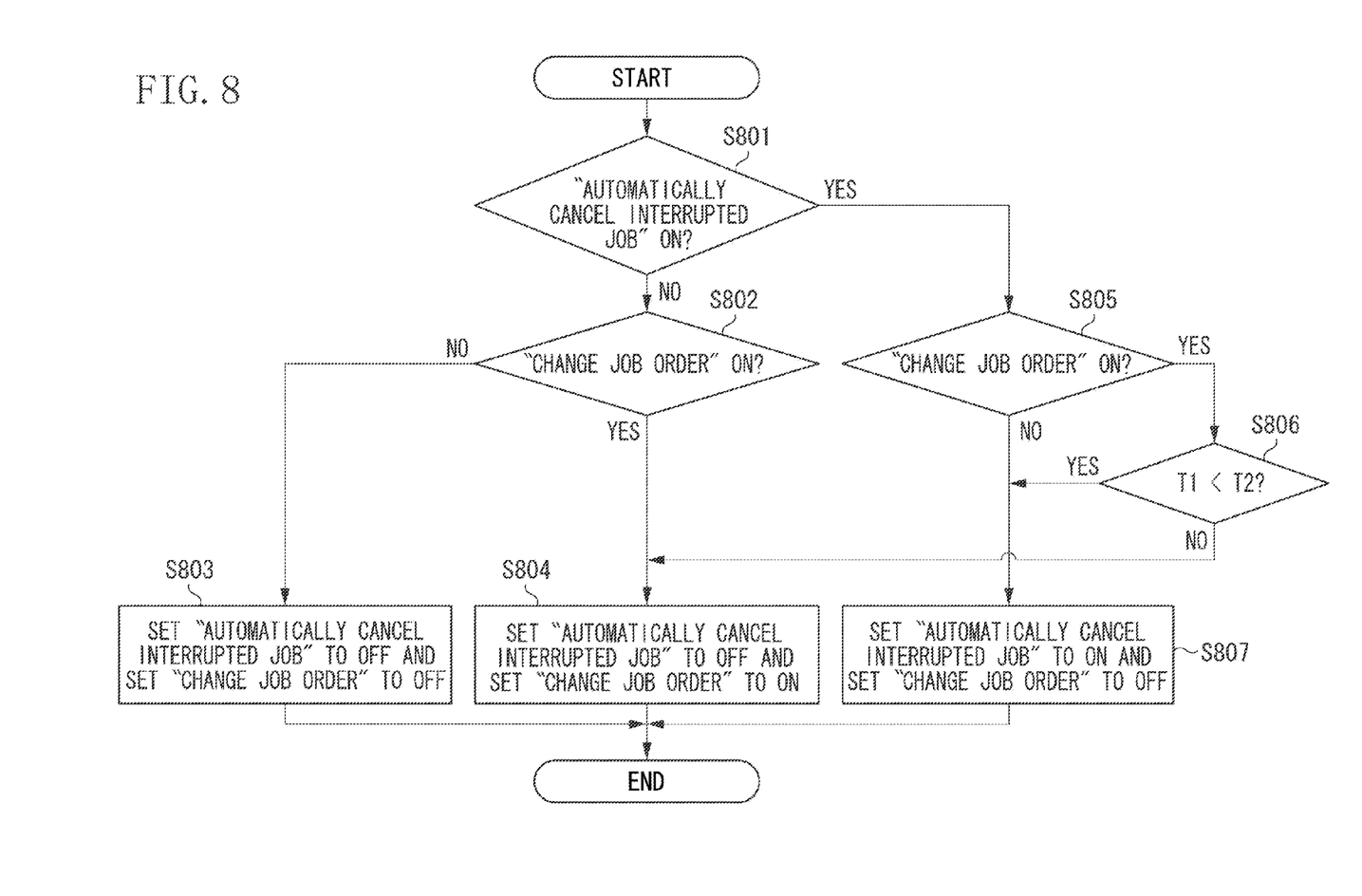
FIG. 8 is a flowchart illustrating an operation of the printing apparatus according to an exemplary embodiment.

FIG. 8 is a flowchart illustrating an operation relating to the settings of "Automatically Cancel Interrupted Job" and "Change Job Order". This flowchart is executed instead of the flowchart illustrated in FIG. 5 according to the first exemplary embodiment. Each operation (step) in the flowchart illustrated in FIG. 8 is implemented when the CPU 107 of the printing apparatus 101 executes a control program stored in the ROM 108.

In step S801, the CPU 107 determines whether "Automatically Cancel Interrupted Job" is ON. When the setting of "Automatically Cancel Interrupted Job" is ON (YES in step S801), the processing proceeds to step S805. On the other hand, when the setting of "Automatically Cancel Interrupted Job" is not ON (the setting is OFF) (NO in step S801), the processing proceeds to step S802. In step S802, the CPU 107 determines whether "Change Job Order" is ON. When the setting of "Change Job Order" is ON (YES in step S802), the processing proceeds to step S804. On the other hand, when the setting of "Change Job Order" is not ON (the setting is OFF) (NO in step S802), the processing proceeds to step S803. In step S803, the CPU 107 sets both "Automatically Cancel Interrupted Job" and "Change Job Order" to OFF.

In step S805, the CPU 107 determines whether "Change Job Order" is ON. When the setting of "Change Job Order" is ON (YES in step S805), the processing proceeds to step S806. On the other hand, when the setting of "Change Job Order" is not ON (the setting is OFF) (NO in step S805), the processing proceeds to step S807.

In step S806, the CPU 107 compares the predetermined time periods T1 and T2. When the predetermined time period T1 is shorter than the predetermined time period T2 (YES in step S806), the processing proceeds to step S807. On the other hand, when the predetermined time period T1 is equal to or longer than the predetermined time period T2 (NO in step S806), the processing proceeds to step S804. This determination in step S806 is based on a concept of giving priority to a function with a shorter time period setting when the predetermined time periods T1 and T2 are different.

In step S804, the CPU 107 sets "Automatically Cancel Interrupted Job" to OFF and sets "Change Job Order" to ON. In step S807, the CPU 107 sets "Automatically Cancel Interrupted Job" to ON and sets "Change Job Order" to OFF.

As described above, the printing apparatus 101 according to the first and the second exemplary embodiments is provided with a management unit (job management queue 200) for managing the execution order of a plurality of print jobs. The printing apparatus 101 accepts a first setting ("Change Job Order") indicating that, if an error occurs during execution of a print job, other print jobs are executed while leaving the execution of the print job interrupted. The printing apparatus 101 further accepts a second setting ("Automatically Cancel Interrupted Job") indicating that, if an error occurs during execution of a print job, the execution of the print job is canceled. If an error occurs during execution of a print job, the printing apparatus 101 performs processing in different ways depending on whether the first or the second setting is made. When the first setting is made, the printing apparatus 101 executes other print jobs while leaving the execution of the print job interrupted. When the second setting is made, the printing apparatus 101 cancels the execution of the print job.

It is possible to selectively set whether to, if an error occurs during execution of a print job, execute other print jobs while leaving the execution of the print job interrupted or cancel the execution of the print job with which the error occurred.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-190467, filed Sep. 28, 2015, which is hereby incorporated by reference herein in its entirety.

What is claimed is:

1. A printing apparatus comprising:
   a management unit configured to manage an execution order of a plurality of print jobs;
   a first accepting unit configured to accept a first setting from a user who is not authenticated as an administrator, the first setting indicating that, in a case where a job interruption event occurs during execution of a print job, another print job managed by the management unit is to be executed while leaving the execution of the print job interrupted;
   a second accepting unit configured to accept a second setting exclusively from a user who is authenticated as the administrator, the second setting indicating that, in a case where a job interruption event occurs during execution of a print job, the execution of the print job is to be canceled; and
   a control unit configured to, when the first setting is made in a case where a job interruption event occurs during execution of a print job, execute another print job managed by the management unit while leaving the execution of the print job interrupted, and to, when the second setting is made in a case where a job interruption event occurs during execution of a print job, cancel the execution of the print job,
   wherein the management unit and the control unit are implemented by a controller of the printing apparatus, and the first accepting unit and the second accepting unit are implemented by a user interface of the printing apparatus.

2. The printing apparatus according to claim 1, wherein the first setting includes a time period since the job interruption event occurs during execution of the print job until the control unit starts the execution of another print job managed by the management unit while leaving the execution of the print job interrupted.

3. The printing apparatus according to claim 1, wherein the second setting includes a time period since the job interruption event occurs during execution of the print job until the control unit cancels the execution of the print job.

4. The printing apparatus according to claim 1, wherein the first and the second settings are exclusively set.

5. The printing apparatus according to claim 1, wherein, when the second setting has been made, the first accepting unit cannot accept the first setting.

6. The printing apparatus according to claim 5, wherein, when the first setting has been made, the first setting is released upon accepting the second setting by the second accepting unit.

7. The printing apparatus according to claim 1, wherein, when neither the first nor the second setting is made in a case where a job interruption event occurs during execution of a print job, the control unit waits, without executing another print job, while leaving the execution of the print job interrupted until the job interruption event occurred is solved.

8. The printing apparatus according to claim 1, further comprising:
   a selection unit configured to select either of the settings in a case where both the first and the second settings are made, wherein the control unit controls an execution of print jobs according to a setting selected by the selection unit, and wherein the selection unit is implemented by the controller.

9. The printing apparatus according to claim 1, wherein the first accepting unit accepts, before the job interruption event occurs, the first setting from a user who is not authenticated as the administrator, and the second accepting unit accepts, before the job interruption event occurs, the second setting exclusively from a user who is authenticated as the administrator.

10. The printing apparatus according to claim 1, wherein the second accepting unit is unable to accept the second setting from a user who is not authenticated as the administrator.

11. A method for controlling a printing apparatus including a management unit configured to manage an execution order of a plurality of print jobs, the method comprising:

accepting a first setting from a user who is not authenticated as an administrator, the first setting indicating that, in a case where a job interruption event occurs during execution of a print job, another print job managed by the management unit is to be executed while leaving an execution of the print job interrupted;

accepting a second setting exclusively from a user who is authenticated as the administrator, the second setting indicating that, in a case where a job interruption event occurs during execution of a print job, the execution of the print job is to be canceled;

executing, when the first setting is made, another print job managed by the management unit while leaving the execution of the print job interrupted due to the occurrence of the job interruption event; and canceling, when the second setting is made, the execution of the print job with which the job interruption event occurred.

12. The method according to claim 11, further comprising prohibiting the first setting from being accepted in a case where the second setting has been made.

13. The method according to claim 12, further comprising releasing, upon accepting the second setting, the first setting which has been made.

14. The method according to claim 11, wherein the first setting is accepted from a user who is not authenticated as the administrator, before the job interruption event occurs, and the second setting is accepted exclusively from a user who is authenticated as the administrator, before the job interruption event occurs, the second setting.

15. The method according to claim 11, wherein the second setting is unable to be accepted from a user who is not authenticated as the administrator.

16. A method for controlling a printing apparatus which manages an execution order of a plurality of print jobs, the method comprising:

accepting a first setting from a first user, the first setting indicating that, in a case where a job interruption event occurs during execution of a print job, another print job managed by the management unit is to be executed while leaving an execution of the print job interrupted;

accepting a second setting from a second user who is different from the first user, the second setting indicating that, in a case where a job interruption event occurs during execution of a print job, the execution of the print job is to be canceled;

executing, when the first setting is made, another print job managed by the management unit while leaving the execution of the print job interrupted due to the occurrence of the job interruption event; and canceling, when the second setting is made, the execution of the print job with which the job interruption event occurred.

17. The method according to claim 16, wherein the first user is a user who is not authenticated as an administrator of the printing apparatus, and the second user is another user who is authenticated as the administrator.

18. The method according to claim 16, wherein the second setting is unable to be accepted from a user who is not authenticated as the administrator.

19. The method according to claim 16, further comprising releasing, according to accepting the second setting, the first setting which has been made.

20. The method according to claim 19, further comprising disabling, according to accepting the second setting, accepting of the first setting.

* * * * *